United States Patent
Issamu Haraguchi (10) Patent No.: US 11,442,030 B2
(45) Date of Patent: Sep. 13, 2022

(54) IMAGING SYSTEM FOR INDUSTRIAL EQUIPMENT AND PROCESS

(71) Applicant: Marcio Issamu Haraguchi, São Paulo (BR)

(72) Inventor: Marcio Issamu Haraguchi, São Paulo (BR)

(*) Notice: Subject to any disclaimer, the term of this patent is extended or adjusted under 35 U.S.C. 154(b) by 0 days.

(21) Appl. No.: 17/050,233

(22) PCT Filed: Jul. 19, 2018

(86) PCT No.: PCT/BR2018/050248
§ 371 (c)(1),
(2) Date: Oct. 23, 2020

(87) PCT Pub. No.: WO2019/204887
PCT Pub. Date: Oct. 31, 2019

(65) Prior Publication Data
US 2021/0080406 A1    Mar. 18, 2021

(30) Foreign Application Priority Data

Apr. 24, 2018    (BR) .................... BR102018008275-2

(51) Int. Cl.
  *G01N 23/046*    (2018.01)
  *G01T 1/29*    (2006.01)
(52) U.S. Cl.
  CPC ............ *G01N 23/046* (2013.01); *G01T 1/29* (2013.01); *G01N 2223/401* (2013.01); *G01N 2223/423* (2013.01); *G01N 2223/601* (2013.01)
(58) Field of Classification Search
  None
  See application file for complete search history.

(56) References Cited

U.S. PATENT DOCUMENTS

2016/0258885 A1*    9/2016    Rothe .................. G01N 23/046

FOREIGN PATENT DOCUMENTS

| BR | 102012024416 | 8/2014 |
| JP | S61-62847 | 3/1986 |
| WO | WO 2013/064838 | 5/2013 |

OTHER PUBLICATIONS

International Search Report for International (PCT) Patent Application No. PCT/BR2018/050248, dated Sep. 26, 2019, 2 pages.

* cited by examiner

*Primary Examiner* — Hoon K Song
(74) *Attorney, Agent, or Firm* — Sheridan Ross P.C.

(57) ABSTRACT

An imaging process for industrial equipment is described using gamma-ray or X-ray profiling techniques and tomographic image reconstruction, wherein (a) a radiation emission subsystem with at least one radiation source emits that passes through an industrial equipment to be analyzed by imaging; (b) a radiation detection subsystem with at least one radiation detector detects the energy of the radiation emitted by the radiation emission subsystem that has passed through said industrial equipment; (c) processing and imaging means receive and evaluate the radiation samples detected by the radiation detection subsystem and generate a tomogram of the analyzed region, selecting the radiation samples detected with an energy value within a range of values corresponding to a maximum defined scattering angle of the radiation emitted by the radiation source, and generating a tomographic reconstruction of images of the industrial equipment based on these selected radiation samples.

13 Claims, 4 Drawing Sheets

IMAGING SYSTEM FOR INDUSTRIAL EQUIPMENT AND PROCESS

CROSS-REFERENCE TO RELATED APPLICATIONS

This application is a national stage application under 35 U.S.C. 371 and claims the benefit of PCT Application No. PCT/BR2018/050248 having an international filing date of 19 Jul. 2018, which designated the United States, which PCT application claimed the benefit of Brazil Patent Application No. BR102018008275-2 filed on 24 Apr. 2018, the contents of each of which are hereby incorporated by reference in their entireties.

The present invention generally refers to the inspection of industrial equipment by means of imagery, in particular, to a system of measuring and generating images of the profile of industrial equipment densities by combining gamma ray profiling techniques and tomographic reconstruction. The present invention is applicable in various industry sectors that use process equipment such as columns, risers, fixed and fluidized bed reactors, heat exchangers, separator vessels and pipes, in order to identify phenomena that may cause mechanical, operational or process problems that influence the proper functioning thereof.

DESCRIPTION OF THE STATE OF THE ART

In continuous production plants, such as refineries and petrochemicals, the performance of process equipment is analyzed with the aid of a process model, depending on its operational variables, the quality of inputs and products. With the advent of increasingly complex processes, projects and operations with strict limits, non-destructive testing technologies have been employed to validate, verify or diagnose the process model in real time (online).

Among the technologies currently available, nuclear techniques stand out for not interfering or altering the process under analysis, allowing real-time evaluations and diagnostics to be made. Techniques such as gamma-ray column profiling, neutron back-scattering, chemical and radioactive tracers and industrial computed tomography become increasingly common practices and represent the most powerful tools for analysis of process equipment in operation.

Among these techniques, gamma scan profiling has become consolidated as one of the best options in the operational mechanical diagnosis of these equipments. In this technique, a sealed radioactive source and a radiation detector are positioned diametrically opposite around the equipment and moved simultaneously along its length. The attenuation values of the radiation that passes through the equipment allows a longitudinal densities profile of the equipment to be obtained. Then, the one-dimensional density (1D) or scan chart profile is analyzed for preparation of the technical test report.

Despite being based on simple principles, its application is complex due to the vast specific knowledge required in its various phases, both to operate the equipment and to interpret the results obtained. In general, a gamma scan specialist should master topics such as: preliminary evaluations (mechanical and process), fieldwork, radiological protection, prior experience, data interpretation, writing and interpersonal skills. This barrier has also proved to be an impediment to the greater dissemination and acceptance of the technique by the market, since the end customer in the industry must also have sound mastery of the technique.

Gamma Scan Particularities

It is important to understand some basic concepts of the gamma ray profiling technique, which involve limitations that restrict its use in some applications:

Count rate Because the time available for field testing is limited, gamma scan is limited to cases where statistically valid count values can be measured;

Average density each point obtained in a profiling relates to the average density of the path traveled by the ionizing radiation beam;

Positioning the interpretation of positioning data is only possible when the characteristics of the object under study are approximately uniform throughout the equipment being inspected; and Dimension gamma-ray profiling offers a one-dimensional view only.

Computed Tomography

Tomography refers to acquiring imagery by sections or slices, by the use of any penetrating wave. The method is used in radiology, archaeology, biology, geophysics, oceanography, materials sciences, astrophysics and other sciences. Tomography is based on mathematical algorithms called tomographic reconstruction.

Physical Principles

Conventional CT scans function through the principle of radiation attenuation called "I", from the initial radiation "$I_0$", which can be analytically expressed by Beer-Lambert law in equation 1:

$$I = I_0 \cdot f(\mu, x) \tag{1}$$

wherein "$\mu$" is the linear attenuation coefficient of the medium for a given energy and "x" is the thickness of the object.

If this physical property varies along a path within the object, the function can be represented as a function product. Using tomographic reconstruction, the distribution of this property within a region under analysis is obtained, with a limited number of measurements. In the process of reconstruction on a tomography, the counts are a function of the linear attenuation coefficient ($\mu$) and of the path traveled given by $$c_i = g(\mu, x, y)$$

and the spatial distribution of the "$\mu$" property is given by the function $$\mu = f(x, y)$$

Conventional Tomography—Basic Operation

In principle, as long as the emission points and reception of signals are known, a tomographic image can be obtained from any type of spatial arrangement. In many cases, the very constitution of the measurement system imposes a geometry or is based on a known geometry for easy implementation of a data processing routine.

Several equipment configurations that measure by tomography techniques can be found. The main differences are in the time required for data sampling, increasing complexity and decreasing flexibility. So a 1st generation CT scanner is more versatile, but it can take hours to complete sampling; while there are already 5th generation CT scanners that can register 10,000 frames per second.

The assembly of industrial CT scans in industrial process equipment is not simple, either due to limitations of assembly, transportation, positioning, weight, robustness and safety.

The longitudinal profile of the spatial distribution of densities within the equipment reveals more information about its operational behavior than the cross sections, so it is important to provide an equipment that is able to obtain this two-dimensional longitudinal profile in a file format that can be reconstituted by easy-to-interpret images, based on an optimized amount of data, so as not to over-increase processing time.

Figure 2:
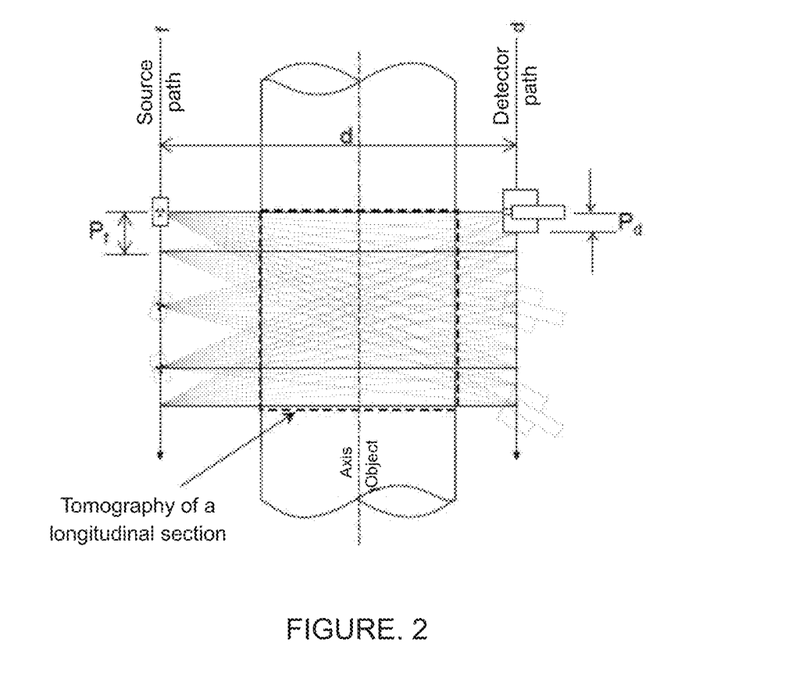
FIG. 2 is a schematic view of an imaging system for industrial equipment of the state of the art.

One way to overcome this difficulty and obtain clearer results from the analysis of industrial equipment is by obtaining a two-dimensional (2D) distribution of densities in a longitudinal plane of the object. Document BR 102012024416-0 discloses a system for measuring and generating images of the longitudinal densities profile of industrial equipment by combining gamma-ray profiling and tomographic reconstruction techniques. The two-dimensional distribution of densities in the longitudinal plane provides a more direct, understandable and therefore better acceptance result in refineries and petrochemicals. The collection of two-dimensional data is made possible by moving the radioactive source and the detector along the longitudinal axis of the equipment through rails, and varying the angles of positioning of the source and the detector, measuring the densities of the medium by different paths traveled by the beam within the medium or equipment being analyzed, as shown in FIG. 2, as disclosed in document BR 102012024416-0. Because industrial equipment has a longitudinal axis many times larger than its other dimensions (width, depth or diameter), the movement of the sealed radioactive source and the radiation detector is, in this case, limited in this application to a plane.

Two-dimensional imaging enables a breakthrough in non-destructive testing technology for industrial equipment, by presenting a number of advantages over the conventional gamma-ray profiling technique:

Dimension the two-dimensional (2D) distribution of densities facilitates visualization and identification of problems, processes and phenomena in an equipment;

Visualization features that in traditional technology (gamma scan) would be hidden, by the values of average density, can be revealed in 2D imaging. From the above, density profiles or equipment that previously could not be profiled by gamma radiation, now have possibilities of evaluation in the field work; and Interpretation 2D imaging is easier to present and interpret than the traditional gamma scan method. This results in a better acceptance of this technological development by the market, and also facilitates the training of technical personnel in refineries and petrochemicals.

The system according to document BR 102012024416-0 allows a data file to be generated, with the necessary information and in an appropriate format for image reconstruction, and generates a tomogram of the analyzed region, with indication of densities presented on a color scale as well as a table of values of the coefficients of mass attenuation ($\mu$) or density ($\rho$) obtained.

This state of the art system typically uses only one emission source and a radiation detector moving through a positioning rail installed along the outer surface of the industrial equipment to be evaluated. The emission source and detector are mounted on supports that feature shields (collimators) that isolate them from background radiation from the environment. These shields feature windows or channels, which are the places through which the radiation beam comes out and enters predominantly from the radioactive source and into the radiation detector, respectively. The brackets can rotate on the plane of the source and detector shafts, allowing the collimation channels to be positioned in various orientations, so that radiation can be sent and measured from different positions.

In each positioning, the orientation of the windows of both the radioactive source and the radiation detector can be changed to cause a perfect alignment of their collimator channels, shown in FIG. 2. Thus, only the radiation that passes through the object in the direction of source alignment detector is measured, avoiding the reading of the scattered radiation.

This technology presents the drawback that the displacement of the source and the detector are limited to the place where its respective positioning rail is installed, limiting the plane or evaluation region of the system to the position of these rails. In addition, the state of the art system needs to know precisely the positioning of the emission source and the detector, and perform a fairly precise alignment between them to obtain accurate measurement results. The equipment for adjusting alignment between source and detector, and the electronic control of this equipment is complex, difficult and increases costs of the system shown in this patent document.

In addition, the system according to this prior art only obtains two-dimensional images of the inside of the equipment, making it difficult to diagnose some particularities of operation and the analysis of the inputs inside it.

OBJECTIVES OF THE INVENTION

It is the objective of present invention to provide an imaging system for industrial equipment and process that dispense with precise angular alignment between radiation emission source and detector, which present a low cost and greater ease of transport and installation of the necessary equipment and that allow a more comprehensive evaluation and of more regions within the industrial equipment evaluated, generating three-dimensional images of high quality and optimized resolution.

BRIEF DESCRIPTION OF THE INVENTION

The objectives of the invention are achieved through an imaging system for industrial equipment using gamma-ray or X-ray profiling techniques and tomographic image reconstruction, comprising:

(a) a radiation emission subsystem with at least one radiation source that emits radiation passing through an industrial equipment to be analyzed by imaging;

(b) a radiation detection subsystem with at least one radiation detector, which detects the energy of the radiation emitted by the radiation emission subsystem that passed through said industrial equipment;

(c) processing and imaging means that receive and evaluate the radiation samples detected by the radiation detection subsystem and generate a tomogram of the analyzed region, where the processing and imaging means select the radiation samples detected with an energy value within a range of values corresponding to a maximum defined scattering angle of the radiation emitted by the radiation source, and generate tomographic reconstruction of imagery of the industrial equipment based on these selected radiation samples.

Said maximum scattering angle can be, for example, less than or equal to 25°, the range of energy values of the selected samples can be set to $$E-TH_i \leq E_M \leq E+TH_s$$

wherein $E_M$=measured sample energy;
E=characteristic energy of the radiation source; and
$TH_i$=lower energy variation limit, and
$TH_s$=upper energy variation limit.

The detection subsystem can comprise a plurality of radiation detectors installed in distinct longitudinal planes on the outer surface of the industrial equipment. The emission subsystem and the detection subsystem are preferably installed on the outer surface of the industrial equipment at a source-detector D distance perpendicular to the longitudinal axis of the equipment, and forming a relative a angle between them, and the source-detector distance D and the relative angle α are known by the means of processing and imaging and used in the tomographic reconstruction of imagery of the industrial equipment. For example, the relative a angle between the source and the detector for measuring the energy of the radiation passing through the industrial equipment can be less than or equal to 45°.

The at least one source and the at least one detector are longitudinally displaceable along the industrial equipment, respectively, in source pitches Pf and detector pitches Pd which, according to an embodiment of the invention, can be less than or equal to one tenth of the source-detector D distance. Source and detector can each comprise a collimator.

The objectives of the invention are also achieved by an imaging process for industrial equipment using a system of the type described herein, the process comprising the following steps:

emitting radiation going through an industrial equipment to be analyzed by imaging;

detecting the radiation emitted that went through said industrial equipment;

selecting detected radiation samples that have an energy value within a range of values corresponding to a defined maximum scattering angle of the radiation emitted by the radiation source, and generating a tomographic reconstruction of industrial equipment images based only on these selected radiation samples.

In an embodiment of the invention, said maximum scattering angle is less than or equal to 25°, and the range of energy values of the selected samples is defined as $E-TH_I \leq E_M \leq E+TH_S$, wherein $E_M$=measured sample energy;

E=characteristic energy of the radiation source; and $TH_I$=lower energy variation limit, and $TH_S$=upper energy variation limit.

The step of detecting the energy of the emitted radiation can be performed by a plurality of radiation detectors installed on different longitudinal planes on the outer surface of the industrial equipment, which detect the radiation emitted by at least one radiation source. During emission and radiation detection, it is possible to move at least one source and at least one detector longitudinally along the industrial equipment, respectively, in source pitches Pf and detector pitches Pd, wherein the source pitches Pf and the detector pitches Pd are less than or equal to one tenth of the source-detector distance D taken perpendicularly to the longitudinal axis of the equipment. In the generation step of a tomographic reconstruction of imagery of the industrial equipment, three-dimensional images can be generated.

SUMMARY DESCRIPTION OF DRAWINGS

The present invention will now be described in further detail based on an example of execution represented in the drawings. The figures show.

DETAILED DESCRIPTION OF FIGURES

Figure 1:
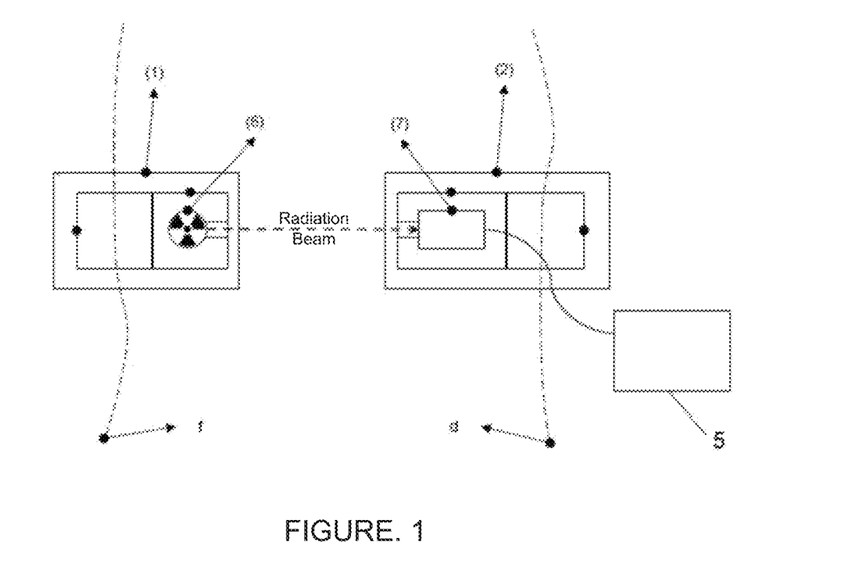
FIG. 1 is a schematic view of a radiation emission subsystem and a radiation detection subsystem used in imaging system for industrial equipments.

The imaging system for industrial equipment according to the invention uses gamma-ray or X-ray profiling techniques and tomographic image reconstruction. As can be seen in FIG. 1, the system according to the invention comprises a radiation emission subsystem 1 and a radiation detection subsystem 2.

The emission subsystem 1 has at least one radiation source 6 that emits radiation that passes through an industrial equipment to be analyzed by imaging. This radiation source may or may not be sealed. Examples of radiation sources applicable to the system according to invention are radioactive sources emitting gamma radiation of higher energies comprising Caesium-137 or Cobalt-60, not limited to these, which are radioisotopes typically used for the gamma graphing of industrial equipment.

The radiation detection subsystem 2 comprises at least one radiation detector 7, which detects the radiation emitted by the radiation emission subsystem 1 that went through said industrial equipment, as shown in FIG. 1. Examples of radiation detectors used in the system according to invention are CsI(TI) or NaI(TI) scintillator detectors, for their higher counting efficiency. They are typically connected to signal amplification and discrimination means, resulting in a typical radiation detection subsystem, which is therefore made up of the following components: scintillator detector, pre-amplifier, amplifier, pulse discrimination module, high voltage module, power module, timer, counter, communication module, connectors and cables.

Both radiation source 6 and radiation detector 7 can be coupled to attenuation, collimation and safety means. Collimators or shields isolate the source and/or radiation detector from backgrounds from the environment, and from scattered radiation. These shields feature windows or channels, which are the places through which the radiation beam comes out and enters predominantly from the radioactive source and into the radiation detector, respectively. In such cases, detector 7 and source 6 are preferably coupled to supports that can rotate on the plane of the source and detector shafts, allowing collimation channels to be positioned in various orientations, so that radiation can be sent and measured from different positions. However, for this collimation to be done effectively, the system must be adjusted to the invention to electronically adjust and control the orientation of the windows of both the radioactive source and the radiation detector to make a perfect alignment of its collimator channels. This increases the complexity of the system as it requires the installation of collimators on rotating supports, and means of control and combined adjustment of the positions of the collimators at the source and in the detector. Therefore, these collimators or shields are not necessary for the operation of the system.

Figure 4:
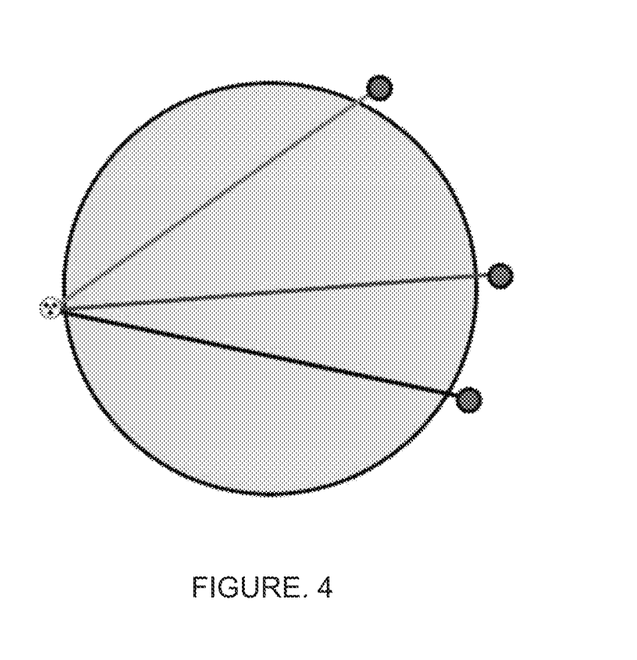
FIG. 4 is a top view of an industrial equipment shown in FIG. 3, with detectors installed in various positions of its outer surface.

Preferably both the at least one source 6 and the at least one detector 7 are installed directly on the outer surface of the industrial equipment under analysis. According to an embodiment of the invention, the detection subsystem comprises a plurality of radiation detectors 7 installed on distinct longitudinal planes on the outer surface of the industrial equipment, as shown in FIG. 4. In this case, the system will perform readings and imaging of the longitudinal planes represented by the lines that connect the source and the detectors, allowing the formation of three-dimensional images.

The radiation source 6 then emits an ionizing radiation on the industrial equipment, which crosses and is attenuated by the equipment under study. Based on Beer-Lambert law $[I=I_0-f(\mu,x)]$ described in the principles of tomography at the beginning of this document, the attenuation sustained by radiation depends on the density ($\rho$) or the values of the mass attenuation coefficients ($\mu$) of the medium, that is, the equipment and the matter contained within it that is crossed by radiation until it reaches the detector. Attenuation also depends on the size of the path traveled. Using tomographic reconstruction, the distribution of this property within a region under analysis is obtained, with a limited number of measurements.

The measured radiation attenuation values allow an average longitudinal density profile of the equipment to be obtained, from which tomographic reproduction by image will be generated. For each position, or path, the function of radiation attenuation can be given as a sequence of attenuations of elements of finite sizes, which results in a product of functions.

In general, a longitudinal section is reduced to a matrix of "m" rows by "n" columns. After the initial radiations pass through this matrix (m×n), all measurements of attenuated radiations are obtained at each of the points (m×n) of the matrix. Each electromagnetic wave (gamma ray or X-ray) that passes through a certain number of cells in this matrix underwent some attenuation measured by the radiation detector. The analytical or iterative resolution, which determines the property of each of these elements, is what the tomographic reconstruction of the image is about.

Figure 3:
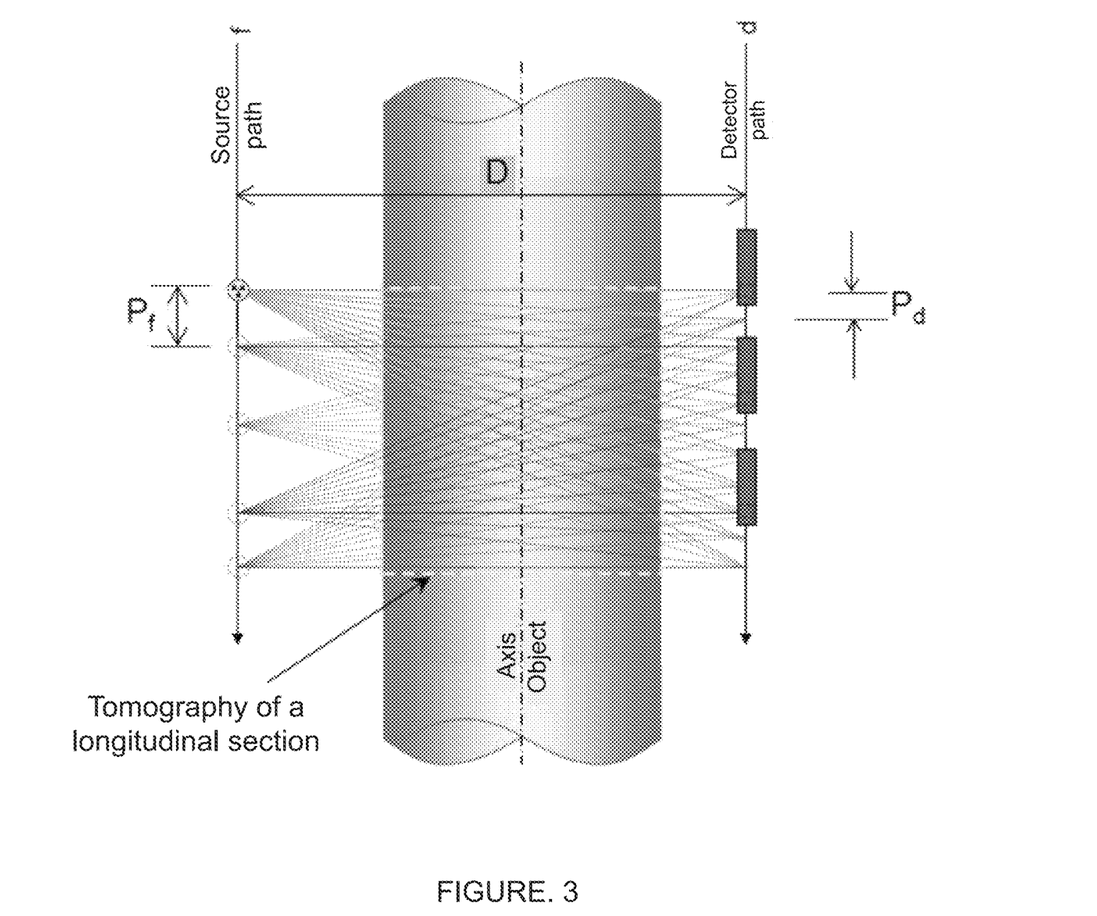
FIG. 3 is a schematic view of an imaging system for industrial equipment according to the invention.

As can be seen in FIG. 3, the radiation emission source and the detector are installed on the outer surface of the industrial equipment at a source-detector Distance D measured perpendicular to the longitudinal axis of the equipment. The source or each source 6 and the detector or each detector 7 form a relative a angle between them, in each position they assume along the longitudinal axis of the equipment.

Source 6 and radiation detector 7 can be moved along the paths shown as "f" and "d" in FIGS. 1 and 3. This displacement can be done along guides installed on the outer surface of the equipment, or it can also be done manually. Alternatively, several detectors can be arranged in various longitudinal and/or peripheral positions of the equipment surface, and only the source can be moved. Or several sources can also be installed on the equipment, however the increase in the number of sources and detectors may excessively increase costs of the equipment.

In order for the system to function properly so as to obtain the desired resolution in tomographic imaging, it is important that the displacements or distances between each reading position of the detectors are controlled and known. Each source and detector are shifted in certain measures called Pf source pitches and Pd detector pitches. Preferably, the Pf source pitches and the Pd detector pitches are less than or equal to one tenth of the source-detector D distance, to ensure the good quality of the image generated. The use of smaller pitches may be desirable or even necessary, when searching for a higher resolution of the tomographic reproduction imagery, reproducing in greater degree of detail the internal densities profile of the equipment. In such cases, the reading and processing time is substantially high. It is therefore ideal to perform an adjustment and a prior configuration of the system, to meet the need of each application.

It has also been experimentally demonstrated that the optimal relative angle $\alpha$ between the source and the detector for measuring the energy of radiation passing through the industrial equipment should be around 45°, to ensure adequate resolution and acceptable quality of the tomographic image obtained. The source-detector D distance and the relative angle $\alpha$ are preferably known and controlled by the system processing and imaging means 5, shown in FIG. 1, mainly in cases where the displacement of the source and detectors is electronically controlled by the processing and imaging means 5.

Figure 7:
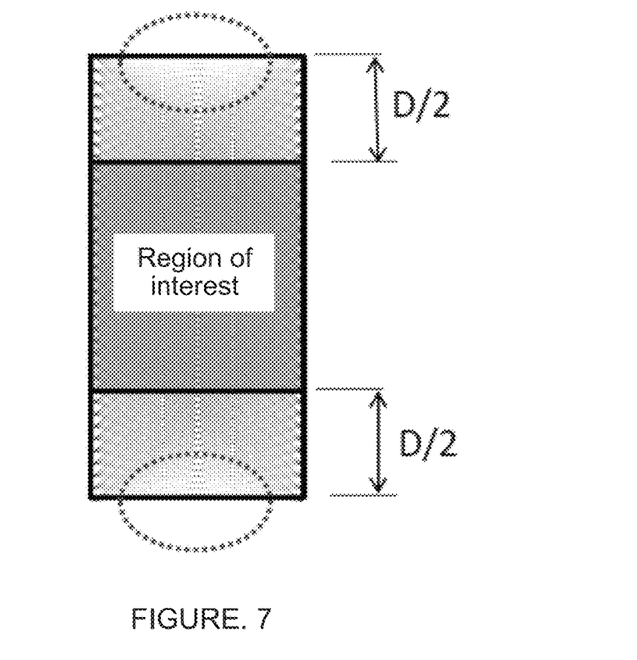
FIG. 7 is a schematic view of the region within the industrial equipment analyzed by the system and by the process according to the invention.

FIG. 7 shows in a schematic way an industrial equipment for analysis according to an embodiment of the invention that uses a maximum relative angle $\alpha$ between the source and the detector equal to 45°. According to the invention, other values of relative angles selected depending on the analyzed equipment, and configuration and operation parameters of the system and the process according to the invention can be used. The source-detector D distance corresponds to the width of the equipment. In this mode of invention, the central region marked as a region of interest begins and ends at a Distance of D/2 above or below the ends at which measurements begin or have just been made. This is because the image quality obtained is worse in the upper and lower central parts involved with dashed lines, because in these parts there are fewer crossings of the lines corresponding to the radiations emitted by the sources and detected by the detectors, which means that less information is obtained about heating parts. In addition, this figure allows us to note that if a very large maximum relative angle $\alpha$ is used, there is virtually no counts of detected energy samples, since the detector source distance becomes larger and the medium is very dense.

The processing and imaging means 5 have appropriate processors and software to evaluate the radiation detected by the detectors, and to generate tomograms of the analyzed regions. The processing and imaging means 5 are therefore connected to the output of the detection subsystem 2 in order to receive the radiation information detected by the radiation detector or the multiple radiation detectors installed in the industrial equipment.

The processing and imaging means 5 preferably also control the radiation emitted by the radiation source 6, because the knowledge of the radiation emitted is important for the identification of the attenuation sustained after it crosses the industrial equipment.

As is known by persons skilled in the art, the radiation emitted by a source spreads in the middle. Some beams of radiation (called non-attenuated photons run a direct path between the source and the detector and are the ones of greatest interest in tomographic reproduction performed by the system of the present invention, because their quantity depends only on attenuations due to the density of the medium crossed, and the length of the path traveled. Other beams (called scattered radiation) sustained deviations and reflections along the way, before being detected by the detector. The deviations and reflections sustained interfere in the computation of the detected radiation, so that it ceases to be a direct function of the path traveled and the density of the medium. This scattered radiation is therefore of lesser interest to tomographic reproduction.

For a better understanding of the fundamentals of this invention, the characteristic energy E of the source, that is, the energy of the photon emitted by the source, is given by the equation E=hυ, wherein u is the frequency of the photon and h is a constant.

When the photon is scattered, the measured energy of the scattered photon is given by the following equation:

$$E_M = h\vartheta' = \frac{h\vartheta}{1 + \frac{h\vartheta}{m_0 c^2}(1 - \cos\theta)}$$

wherein the angle θ is the angle of scattering or deflection of the photon in relation to the direct and rectilinear path of the photon coming from the source. Therefore, the scattering angle interferes with the measured energy of the photon detected $E_M$ after scattering, along with the attenuations due to the density of the medium and the distance traveled, as discussed herein earlier.

Figure 5:
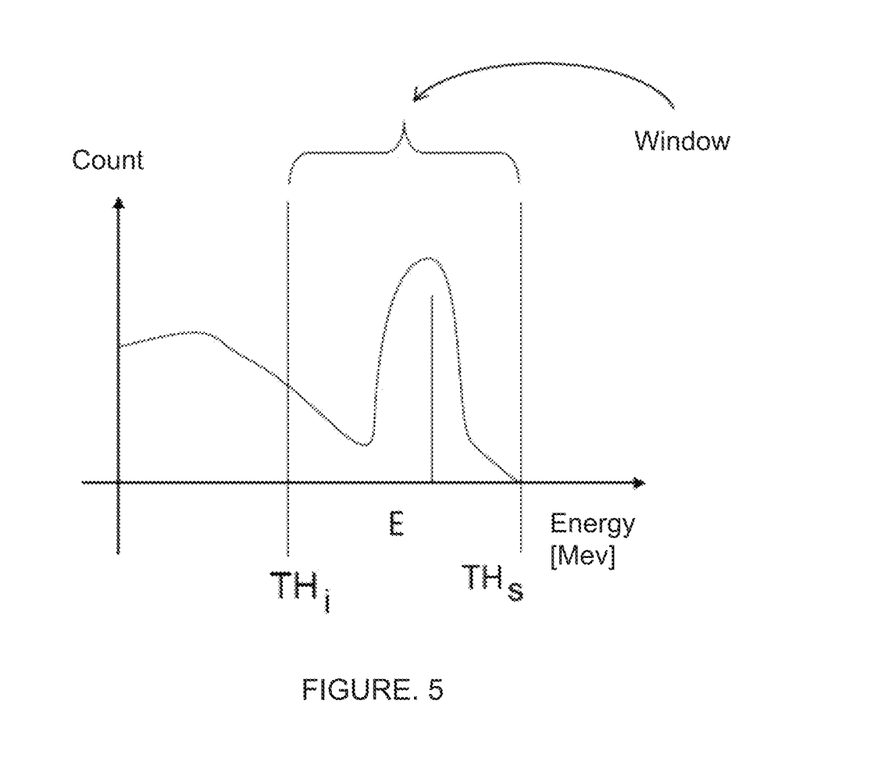
FIG. 5 is an exemplary graph of a spectrum of radiation source energy that is detected by a detector of the system according to invention.

FIG. 5 shows a graph relating the amount of radiation samples detected by a detector and the energy of these samples, forming a spectrum of detected energies. The E value shown in the graph corresponds to the characteristic energy of the radioactive source. The samples around the E value of energy characteristic of the radioactive source usually correspond to the radiation with the lowest scattering and, therefore, better represent the variation of density of the traversed medium. The samples that appear in the region further to the left of the graph, near the axis of the ordered ones, having less energy, which means that they have undergone greater scattering, or may come from other origins in the medium under evaluation.

One way to use only detected energy samples that have not sustained or undergone only an acceptable degree of scattering is by selecting only the samples in a window or range of values around the E value in the graph.

Figure 6:
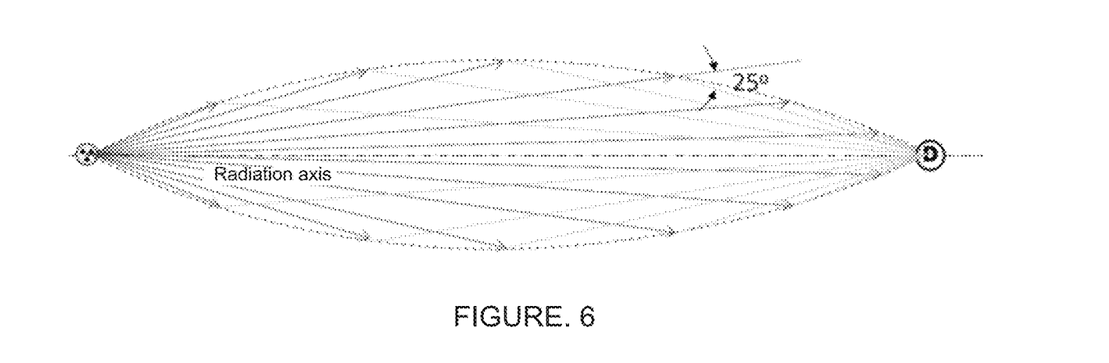
FIG. 6 is an exemplary graph of the volume within the industrial equipment corresponding to the radiation detected by the system detector, which is selected to generate the tomographic image of the equipment.

The window of values around the E value, as shown in FIG. 5, corresponding to the energy range that is to be observed, so that only the radiation samples measured within that window should be taken into account in the evaluation for tomographic reproduction. This range of energy values of the samples corresponds to a defined maximum scattering angle of the radiation emitted by the radiation source, which is acceptable for tomographic reproduction. The graphic illustration of FIG. 6 shows an almond profile volume that involves the radiation measured by the detector, radiation that has a maximum scattering angle of 25°, a value used in this embodiment of the system according to the invention. However, you can use other maximum scatter angle values that may vary with the type of source and other system and equipment requirements under analysis.

Looking at the graph in FIG. 5, the window or range of values is formed around the characteristic energy value of the E source, and between the limits of lower energy variation $TH_i$ and superior $TH_s$. This window corresponds to the range of energy values of the samples selected for tomographic reproduction. Thus, the processing and imaging means 5 are configured to select only the samples of measured energy $E_M$ that meet the E−$TH_i$≤$E_M$≤E+$TH_s$ ratio, while the other samples are discarded. The lower energy variation limits $TH_i$ and superior $TH_s$ therefore represent the energy values of the samples with the maximum scattering angle, for example in this embodiment, 25°.

The invention also refers to an imaging process for industrial equipment using a system as described herein. In this process, a radiation is emitted and passes through the industrial equipment to be analyzed. The radiation emitted that went through said industrial equipment is detected. A selection is made of the detected radiation samples that have an energy value within the range of values corresponding to the maximum scattering angle of the radiation emitted from the radiation source, this angle being preferably less than or equal to 25°. The range of energy values of the selected samples is preferably defined by the E−$TH_i$≤$E_M$≤E+$TH_s$ ratio described herein above. A tomographic reconstruction of industrial equipment imagery is then generated based only on these selected radiation samples.

The step of detecting the energy of the emitted radiation can be performed by a plurality of radiation detectors 7 installed on different longitudinal planes on the outer surface of the industrial equipment, which detect the radiation emitted by one or more radiation sources 7 of the type described herein.

During emission and radiation detection, the source(s) or the detectors are shifted longitudinally along the industrial equipment, respectively, in source pitches Pf and detector pitches Pd. In a preferred embodiment of the invention, the source pitches Pf and detector pitches Pd are less than or equal to one tenth of the source-detector distance D taken perpendicularly to the longitudinal axis of the equipment. The value of 1/10 of the source-detector distance so far has resulted in a good compromise between the quality of the result and the working time. However, other step values can be used to be selected depending on the project.

The system and method of the present invention therefore dispense with collimation and accurate alignment of the source and detector, since the selection of radiation samples measured within a given energy range already eliminates the reading of scattered and unwanted radiation. This effect resulting from the selection and samples is therefore similar to that of collimation made by collimators or shields. However, the present invention achieves a more accurate selection of detected radiation that is useful for tomographic reproduction, and with a simpler technique, which dispenses components that perform perfect physical alignment between source and detector, as well as electronic control of these components. This reduces the complexity of the equipment required in assembling the system according to the invention, making it simpler, lighter, portable, also reducing its cost.

The system and the process according to the invention also enable the installation of detectors on different longitudinal planes of the equipment to be analyzed, as shown in FIG. 4, and the simultaneous use of these detectors, which allows three-dimensional imaging to be obtained in a simple way and at low cost.

During operation of the system and process according to the invention the processing and imaging means 5 can manage the positioning, acquisition of data by detectors and the processing of image data, automating communication and sequencing of the sampling steps of the radiation detected.

The processing and imaging means 5 can perform the following procedures: choice of dimensions of the physical arrangement and the necessary adjustments of the instruments for the measurement of the radiation of interest, test and adjustment of the instruments to obtain an optimal relationship between counting efficiency and accuracy of tomographic reconstructions obtained from the two techniques involved gamma-ray or X-ray profiling and tomographic reconstruction. The processing and imaging means 5 also contain a computer program designed to generate a data file in a format appropriate for the reconstruction of tomograms of the analyzed region with indication of densities presented on a color scale, as well as a table of the values of the mass attenuation coefficients ($\mu$) or density coefficients ($\rho$) obtained.

Ct scans can be generated on any plane whether horizontal, vertical or slanted, comprising tomographies of the longitudinal section, in which reconstruction is done directly and not from the interpolation of other tomographies, and cross sections or slanted sections of industrial equipment. Tomographic reconstruction methods typically employed include ART (Algebraic Reconstruction Technique), MART (Multiplicative Algebraic Reconstruction Technique) and FBP (Filtered Back Projection).

The imaging system and process of the present invention can be applied to different types of industrial equipment, including, but not limited to, process columns, risers, fixed and fluidized bed reactors, heat exchangers, separator vessels and pipes, and to different types of industrial equipment internals, including, but not limited to, perforated plates, valved plates, multispout plates, high efficiency plates, random and ordered fillings, collector and redispensing plates, liquid and steam dispensers, mist eliminators, fixed and mobile mixers. Similarly, the present invention can also be applied to different types of industrial processes, including, but not limited to, distillation, separation, adsorption, absorption, refining, purification, extraction, concentration, reaction and catalytic reaction, transport of solids, liquids, gases and fluidized bed, heat exchange and mass.

The ease of installation of the source and detectors allows the present invention to be applied in different types of industrial processes, comprising distillation, separation, adsorption, absorption, refining, purification, extraction, concentration, reaction and catalytic reaction, transport of liquid solids, gases and fluidized bed, heat exchange and mass. In practice, path characteristics, the available test time, and the desired level of detail determine the amount and location of the positionings made. In each position, a reading is taken of the radiation that passes through the object under study in the source-detector direction. Specific adjustments in measured pulse height are those which determine the energy of measured ionizing radiation.

The invention claimed is:

1. An imaging system for industrial equipment using gamma-ray or X-ray profiling techniques and tomographic image reconstruction, comprising:
   (a) a radiation emission subsystem with at least one radiation source that emits radiation passing through an industrial equipment to be analyzed by imaging;
   (b) a radiation detection subsystem with at least one radiation detector, which detects the radiation energy emitted by the radiation emission subsystem that has passed through said industrial equipment;
   (c) processing and imaging means that receive and evaluate radiation samples detected by the radiation detection subsystem and generate a tomogram of an analyzed region, the system characterized in that processing and imaging means select the radiation samples detected with energy value within a range of values corresponding to a maximum defined scattering angle of the radiation emitted by the radiation source, and generates a tomographic reconstruction of images of the industrial equipment based on the selected radiation samples, wherein the range of energy values of the selected samples is defined as:

$$E - TH_i \leq E_M \leq E + TH_s$$

wherein
$E_M$ = measured sample energy;
$E$ = characteristic energy of the radiation source; and
$TH_i$ = lower energy variation limit, and
$TH_s$ = upper energy variation limit.

2. The imaging system for industrial equipment, according to claim 1, wherein the said maximum scattering angle is less than or equal to 25°.

3. The imaging system for industrial equipment, according to claim 1, wherein the detection subsystem comprises a plurality of radiation detectors installed on different longitudinal planes on the outer surface of the industrial equipment.

4. The imaging system for industrial equipment, claim 1, wherein the emission subsystem and the detection subsystem are installed on the outer surface of the industrial equipment at a source-detector distance (D) perpendicular to the longitudinal axis of the equipment, and forming a relative angle ($\alpha$) between them, and the source-detector distance (D) and the relative angle ($\alpha$) are known by the processing and imaging means used in the tomographic reconstruction of images of industrial equipment.

5. The imaging system for industrial equipment, according to claim 4, wherein the relative angle ($\alpha$) between the source and the detector for measuring the energy of radiation passing through the industrial equipment is less than or equal to 45°.

6. The imaging system for industrial equipment, claim 4, wherein the at least one source and the at least one detector are longitudinally displaced along the industrial equipment, respectively, in source pitches (Pf) and detector pitches (Pd), wherein the source pitches (Pf) and detector pitches (Pd) are less than or equal to one tenth of the source-detector distance (D).

7. The imaging system for industrial equipment, according to claim 1, wherein the at least one source and at least the one detector each comprise a collimator.

8. An imaging process for industrial equipment, comprising the following steps:
   emitting radiation that goes through an industrial equipment to be analyzed by imaging;
   detecting the radiation emitted that passed through said industrial equipment;
   selecting detected radiation samples that have an energy value within a range of values corresponding to a defined maximum scattering angle of the radiation emitted by the radiation source, and
   generating a tomographic reconstruction of industrial equipment images based only on the selected radiation samples,
   wherein the energy value range of the selected samples is defined as $$E - TH_i \leq E_M \leq E + TH_s$$

wherein $E_M$=measured sample energy;

E=characteristic energy of the radiation source; and $TH_i$=lower energy variation limit, and $TH_s$=upper energy variation limit.

9. The process, according to 8, wherein the said maximum scattering angle corresponding to the range of values of the selected samples is less than or equal to 25°.

10. The process, according to claim 8, wherein the step of detecting the energy of the emitted radiation is performed by a plurality of radiation detectors installed in different longitudinal planes on the outer surface of the industrial equipment, which detect the radiation emitted by at least one radiation source.

11. The process, according to claim 8, comprising, during emission and radiation detection, shifting the at least one source and the at least one detector longitudinally along the industrial equipment, respectively, in source pitches (Pf) and detector pitches (Pd), wherein the source pitches (Pf) and the detector pitches (Pd) are less than or equal to one tenth of the source-detector distance (D) taken perpendicularly to the longitudinal axis of the equipment.

12. The process, according to claim 8, wherein the step of generating a tomographic reconstruction of images of industrial equipment comprises generating three-dimensional images.

13. The process, according to claim 8, using an imaging system for the industrial equipment with gamma-ray or X-ray profiling techniques and tomographic image reconstruction, the imaging system comprising:

(a) a radiation emission subsystem with at least one radiation source that emits the radiation passing through the industrial equipment to be analyzed by imaging;

(b) a radiation detection subsystem with at least one radiation detector, which detects the radiation energy emitted by the radiation emission subsystem that has passed through said industrial equipment; and (c) processing and imaging means that receive and evaluate the radiation samples detected by the radiation detection subsystem and generate the tomographic reconstruction of an analyzed region based only on the selected radiation samples.

* * * * *